United States Patent
Matsumoto

(10) Patent No.: US 8,941,321 B2
(45) Date of Patent: Jan. 27, 2015

(54) DISCHARGE LAMP LIGHTING DEVICE, AND ILLUMINATION APPARATUS AND VEHICLE INCLUDING SAME

(71) Applicant: Panasonic Corporation, Osaka (JP)

(72) Inventor: Koji Matsumoto, Niigata (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/862,509

(22) Filed: Apr. 15, 2013

(65) Prior Publication Data

US 2013/0271002 A1 Oct. 17, 2013

(30) Foreign Application Priority Data

Apr. 13, 2012 (JP) ................. 2012-092234

(51) Int. Cl.
| | | |
|---|---|---|
| H05B 37/02 | (2006.01) | |
| B60Q 1/14 | (2006.01) | |
| H05B 41/282 | (2006.01) | |

(Continued)

(52) U.S. Cl.
CPC .......... H05B 41/282 (2013.01); H05B 41/2886 (2013.01); H02M 7/4807 (2013.01); Y02B 20/202 (2013.01)
USPC ........................................... 315/291; 315/77

(58) Field of Classification Search
CPC ...................................................... H05B 37/02
USPC ............. 315/291, 209 R, 246, 247, 294, 307, 315/DIG. 2, DIG. 4
See application file for complete search history.

(56) References Cited

U.S. PATENT DOCUMENTS

| 7,208,882 B2 | 4/2007 | Ishizuka |
| 7,906,917 B2 * | 3/2011 | Tripathi et al. ............... 315/291 |
| 2003/0111969 A1 | 6/2003 | Konishi et al. |

(Continued)

FOREIGN PATENT DOCUMENTS

| CN | 1456029 | 11/2003 |
| CN | 101341801 | 1/2009 |

(Continued)

OTHER PUBLICATIONS

European Search Report for corresponding European Patent Application No. 13163252.3 dated Nov. 21, 2013 (Search Report was previously submitted on Feb. 20, 2014).

(Continued)

*Primary Examiner* — Minh D A
(74) *Attorney, Agent, or Firm* — Renner, Otto, Boisselle & Sklar, LLP

(57) ABSTRACT

A discharge lamp lighting device light which drives a discharge lamp with an alternating power includes a DC-DC converter, an inverter, a voltage detector which detects an output voltage of the DC-DC converter, and a current detector which detects an output current of the DC-DC converter. The discharge lamp lighting device light further includes a controller controlling a switching frequency of the DC-DC converter according to a detection value of at least one of the voltage detector and the current detector; and a PWM ON signal controller increasing a DC power by lengthening an ON duty of a PWM signal during a predetermined period after a start of polarity inversion of the alternating power. When the voltage detector and/or the current detector detects a detection value, the controller changes an increase amount of the DC power according to the detection value.

10 Claims, 13 Drawing Sheets

(51) Int. Cl.
*H05B 41/288* (2006.01)
*H02M 7/48* (2006.01)

(56) References Cited

U.S. PATENT DOCUMENTS

| | | |
|---|---|---|
| 2005/0264237 A1 | 12/2005 | Ishizuka |
| 2009/0323033 A1 | 12/2009 | Konishi et al. |
| 2010/0013399 A1* | 1/2010 | Ono et al. .................... 315/224 |
| 2010/0052538 A1 | 3/2010 | Tanaka et al. |
| 2010/0085784 A1* | 4/2010 | Chou et al. ................... 363/45 |
| 2010/0219765 A1 | 9/2010 | Toda et al. |
| 2012/0038276 A1 | 2/2012 | Nakamura |
| 2012/0074858 A1* | 3/2012 | Ono et al. .................. 315/209 R |

FOREIGN PATENT DOCUMENTS

| | | |
|---|---|---|
| CN | 101849438 | 9/2010 |
| CN | 101938879 | 1/2011 |
| EP | 2268109 | 12/2010 |
| EP | 2 413 668 A1 | 2/2012 |
| JP | H05-258879 A | 10/1993 |
| JP | H08-222390 A | 8/1996 |
| JP | 2003-133092 A | 5/2003 |
| JP | 2005-101016 | 4/2005 |
| JP | 2008-112696 | 5/2008 |
| JP | 2010-55834 | 3/2010 |
| JP | 2010-114091 | 5/2010 |
| JP | 2010-231995 | 10/2010 |
| JP | 2010-231996 | 10/2010 |
| JP | 2011-233267 | 11/2011 |
| KR | 10-2006-0049472 | 5/2006 |

OTHER PUBLICATIONS

Chinese Office Action dated Sep. 30, 2014 and English translation thereof for corresponding Chinese Application No. 201310128119.2.
Korean Office Action dated Jul. 24, 2014 issued in a corresponding Korean application No. 10-2013-0040390 and the English summary thereof.

* cited by examiner

FIG. 8A
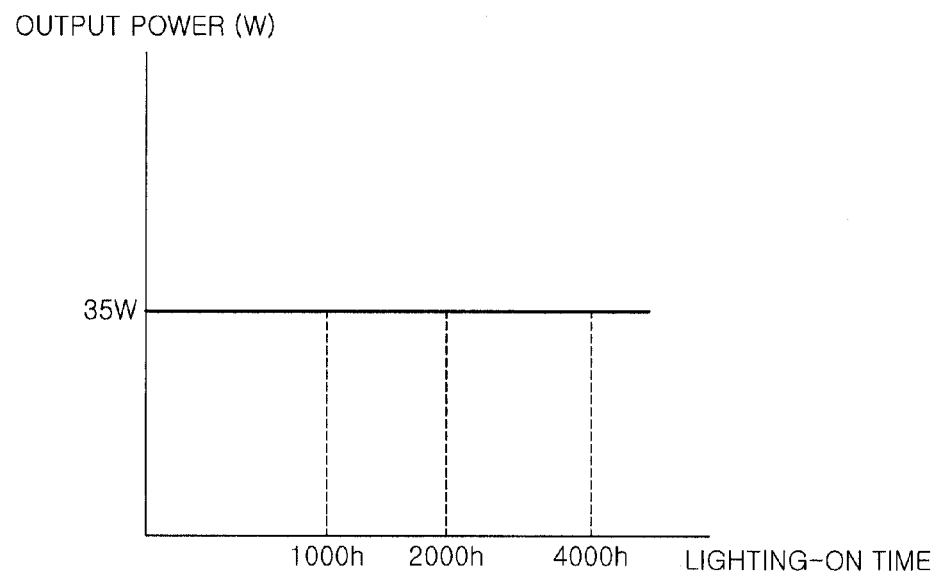
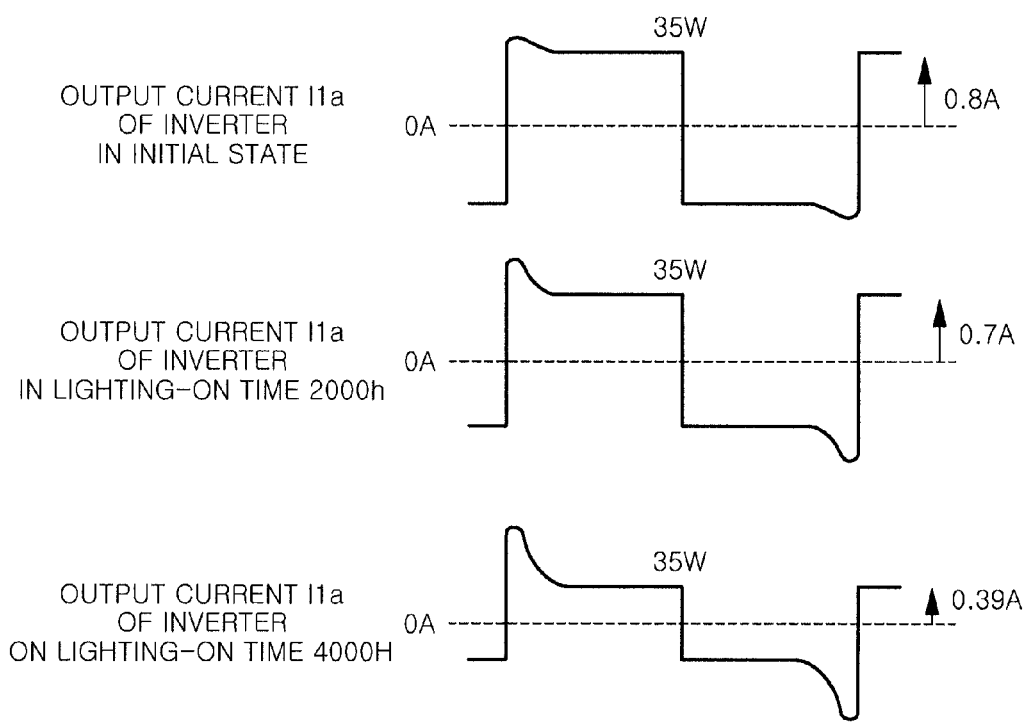

FIG.8B
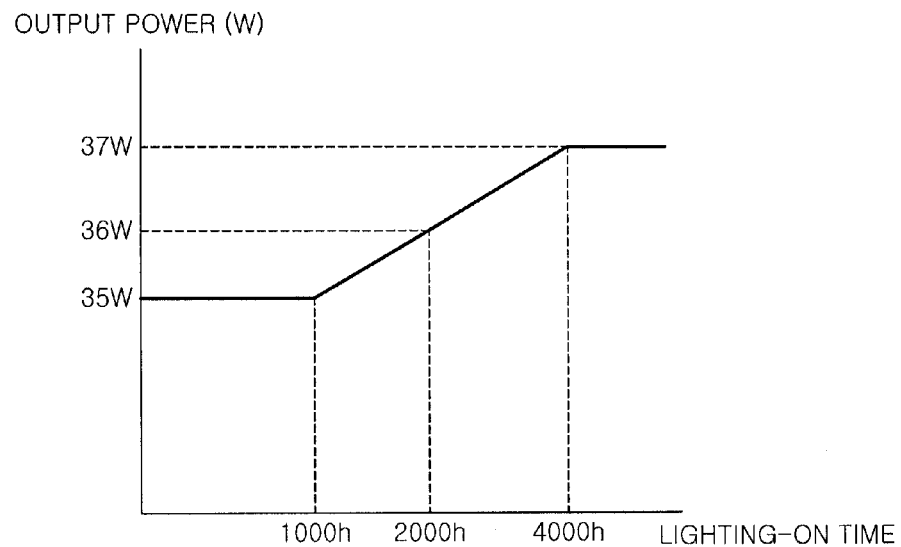
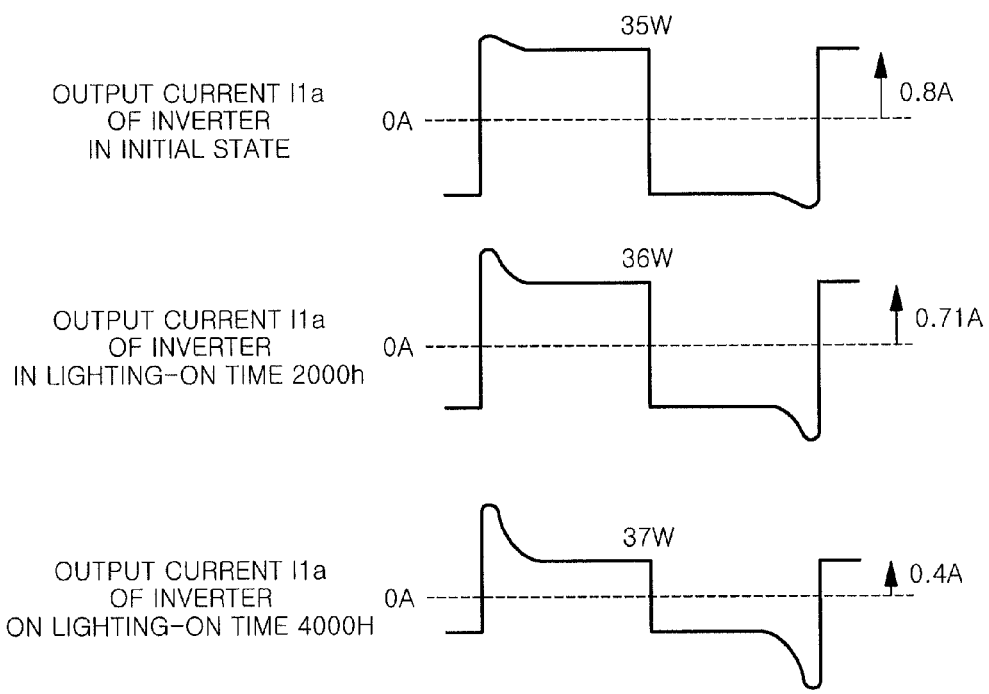

DISCHARGE LAMP LIGHTING DEVICE, AND ILLUMINATION APPARATUS AND VEHICLE INCLUDING SAME

FIELD OF THE INVENTION

The present invention relates to a discharge lamp lighting device which drives a discharge lamp, and an illumination apparatus and a vehicle including the same.

BACKGROUND OF THE INVENTION

Conventionally, a high intensity discharge lamp (HID lamp) such as a metal halide lamp is used in a vehicle headlamp because of its high luminous flux. The discharge lamp used in a vehicle headlamp is turned on by a discharge lamp lighting device that converts a DC power inputted from a battery into an AC power.

FIG. 10 shows a circuit configuration of a conventional discharge lamp lighting device. In the discharge lamp lighting device, a DC-DC converter 104 converts a DC voltage of a DC power source into a predetermined DC power. The DC power is converted by an inverter 105 into a low-frequency alternating square wave power and then is supplied to the discharge lamp La via a starting circuit 130. The DC-DC converter 104 is formed of a flyback converter, and the DC power supplied to the inverter 105 is controlled by adjusting a pulse width modulation (PWM) signal to drive a switching element Q0 connected in series with a primary winding of a transformer T.

The inverter 105 has full-bridged switching elements Q1 to Q4. The inverter 105 converts a DC power from the DC-DC converter 104 into an alternating square wave power by alternately turning on and off a pair of switching elements Q1 and Q4, and a pair of switching elements Q2 and Q3. At the startup of the discharge lamp La, the starting circuit 130 supplies a pulse current to a primary side of a pulse transformer PT by a pulse drive circuit 131, and applies a high voltage generated on a secondary side of the pulse transformer PT according to a ratio of the number of coil windings, to the discharge lamp La, thereby initiating the discharge lamp La.

In the discharge lamp lighting device configured as such, a low-frequency alternating square wave power is supplied to the discharge lamp La from the inverter 105 in order to avoid acoustic resonance phenomena. In the polarity inversion of the alternating square wave power, an output currents I1$a$ (lamp current) passes through a zero point. Accordingly, the discharge stops at a moment when the polarity of the output current I1$a$ is inverted. Then, in order for the output current I1$a$ to pass the zero point and begin flowing in the reverse direction, it is necessary to apply a predetermined high voltage generally referred to as "re-ignition voltage" to the discharge lamp La.

As shown in FIG. 11, when an output voltage Vo of the inverter 105 is inverted, the output current I1$a$ is also inverted. Since there is a secondary side inductance Lp in the pulse transformer PT of the starting circuit 130, it is impossible to sharply change the lamp current I1$a$ like the voltage Vo. That is, the output current I1$a$ is inverted at a predetermined slope dI1$a$/dt.

It is necessary to increase the re-ignition voltage as the slope dI1$a$/dt of the lamp current I1$a$ in the polarity inversion gets smaller. If the re-ignition voltage is not sufficiently supplied from the inverter 105, as shown in FIG. 12, a time period Ts is generated in which the lamp current I1$a$ is zero or lower than normal. As a result, a noise may occur in the pulse current, or the lifespan of the discharge lamp La may be reduced. Further, when the time period Ts becomes longer, it may cause flickering or turn off.

Accordingly, in the discharge lamp lighting device, by increasing the output of the DC-DC converter 104 and increasing the output voltage Vo of the inverter 105 in the polarity inversion, a required re-ignition voltage is ensured. Specifically, the discharge lamp lighting device 1 includes a PWM ON signal controller 109 to increase the DC power. The PWM ON signal controller 109 extends the ON duty of the PWM signal during a predetermined period from the start of the polarity inversion, in the switching conditions immediately before the polarity of the alternating power is inverted.

The PWM ON signal controller 109 includes an edge detection/one-shot pulse circuit 191 and an ON duty increase circuit 192. The edge detection/one-shot pulse circuit 191 detects a rising edge and a falling edge of a signal outputted from a low frequency oscillation circuit (LF-OSC) of an inverter driving signal generator 106 and generates a pulse signal with a predetermined width. The ON duty increase circuit 192 outputs a signal to increase the ON period of the switching element Q0 in the duration of the pulse width of the PWM signal outputted from the PWM signal generator 108, so that the output of the DC-DC converter 104 is increased. By this configuration, the discharge lamp lighting device can ensure the sufficient re-ignition voltage by increasing the output voltage of the inverter 105 (see, e.g., Japanese Patent Laid-open Publication No. 2010-231995).

In the discharge lamp lighting device described in Japanese Patent Laid-open Publication No. 2010-231995, a predetermined amount of the output voltage is increased regardless of an initial use state or an end-of-life state. Accordingly, in the initial state of the discharge lamp in which the lamp voltage is low, there is a possibility of increasing the stress which is applied to the discharge lamp, worsening the switching noise, or shortening the lifespan of the discharge lamp or the like.

SUMMARY OF THE INVENTION

In view of the above, the present invention provides a discharge lamp lighting device capable of ensuring a required re-ignition voltage according to a use state of a discharge lamp, and an illumination apparatus for a vehicle and a vehicle including the same.

In accordance with a first aspect of the present invention, there is provided a discharge lamp lighting device light which drives a discharge lamp with an alternating power, including: a DC-DC converter configured to convert a voltage of a DC power source into a DC power and output the DC power, by changing a PWM signal inputted to a switching element; an inverter configured to convert the DC power into the alternating power having a frequency low than a switching frequency of the DC-DC converter; a voltage detector which detects an output voltage of the DC-DC converter; a current detector which detects an output current of the DC-DC converter; a controller configured to control the switching frequency of the DC-DC converter according to a detection value of at least one of the voltage detector and the current detector; and a PWM ON signal controller which increases the DC power by lengthening an ON duty of the PWM signal during a predetermined period after a start of polarity inversion of the alternating power, wherein when at least one of the voltage detector and the current detector detects a predetermined detection value, the controller changes an increase amount of the DC power increased by the PWM ON signal controller according to the detection value.

In the discharge lamp lighting device, a polarity of the alternating power may be inverted in synchronization with a switching of the switching element immediately after the ON duty is increased by the PWM ON signal controller.

The controller may change the DC power according to the detection value of the voltage detector, from immediately before a polarity of the alternating power is inverted.

The controller may set an upper limit in the increase amount of the DC power, and maintain the increase amount at the upper limit when a voltage value detected by the voltage detector is equal to or greater than a voltage value corresponding to the upper limit.

The controller may further set a lower limit in the increase amount of the DC power, and maintain the increase amount at the lower limit when a voltage value detected by the voltage detector is equal to or less than a voltage value corresponding to the lower limit.

The controller may count a lighting time of the discharge lamp, and change the DC power according to the lighting time.

The discharge lamp lighting device may further include an input voltage detector which detects an input voltage value of the DC-DC converter, and, when the input voltage detector detects a predetermined voltage value, the controller may an increase amount of the DC power according to the detected voltage value.

In accordance with a second aspect of the present invention, there is provided an illumination apparatus including the discharge lamp lighting device described above.

In accordance with a second aspect of the present invention, there is provided a vehicle including the illumination apparatus described above.

With the above configuration, the DC power outputted from the DC-DC converter is increased based on at least one of the detection values of the voltage detector and the current detector. Thus, it is possible to ensure an adequate re-igniting voltage according to the use state of the discharge lamp.

BRIEF DESCRIPTION OF THE DRAWINGS

The objects and features of the present invention will become apparent from the following description of embodiments, given in conjunction with the accompanying drawings, in which:

FIGS. 8A and 8B show waveforms for explaining still another modification of the present invention;

DETAILED DESCRIPTION OF THE EMBODIMENTS

Hereinafter, a discharge lamp lighting device 1 in accordance with an embodiment of the present invention and an illumination apparatus for a vehicle and a vehicle including the same will be described with reference to FIGS. 1 to 5.

Figure 1:
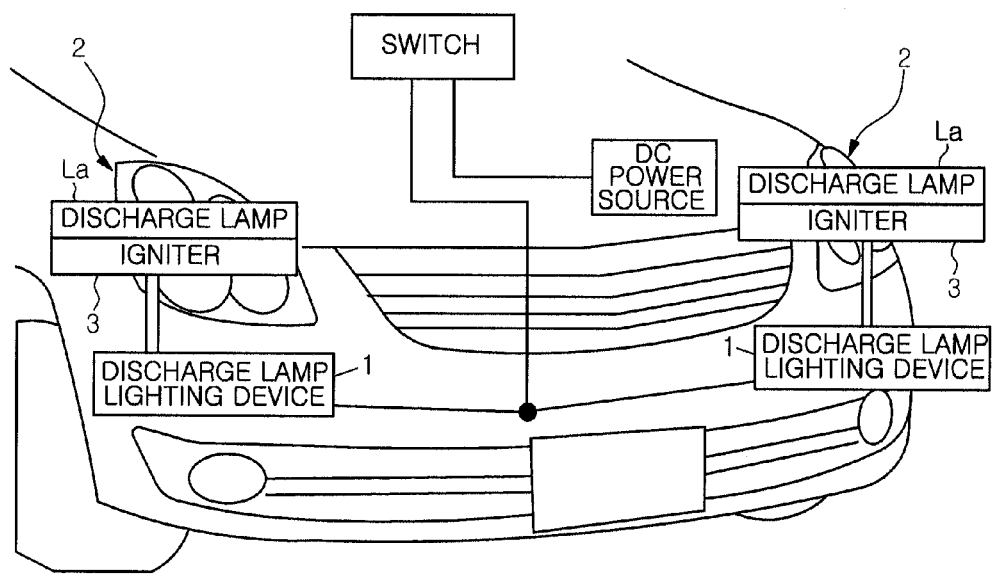
FIG. 1 is a schematic diagram of a discharge lamp lighting device, an illumination apparatus for a vehicle and a vehicle including the same in accordance with an embodiment of the present invention.

As shown in FIG. 1, the discharge lamp lighting device according to this embodiment is used in each of the illumination apparatuses 2 mounted on a vehicle 10. When a switch SW is turned on, the discharge lamp lighting device 1 converts a DC power supplied from a battery (DC power source) and supplies the power to a discharge lamp La serving as a light source. The power outputted from the discharge lamp lighting device 1 is inputted to an igniter 3, and the igniter 3 generates a high voltage pulse required to start lighting of the discharge lamp La. Further, in an illustrated example, the discharge lamp lighting device 1 is disposed in each of a pair of left and right illumination apparatuses 2 (headlamps), but one discharge lamp lighting device 1 may be configured to control lighting of a plurality of illumination apparatuses 2.

Figure 2:
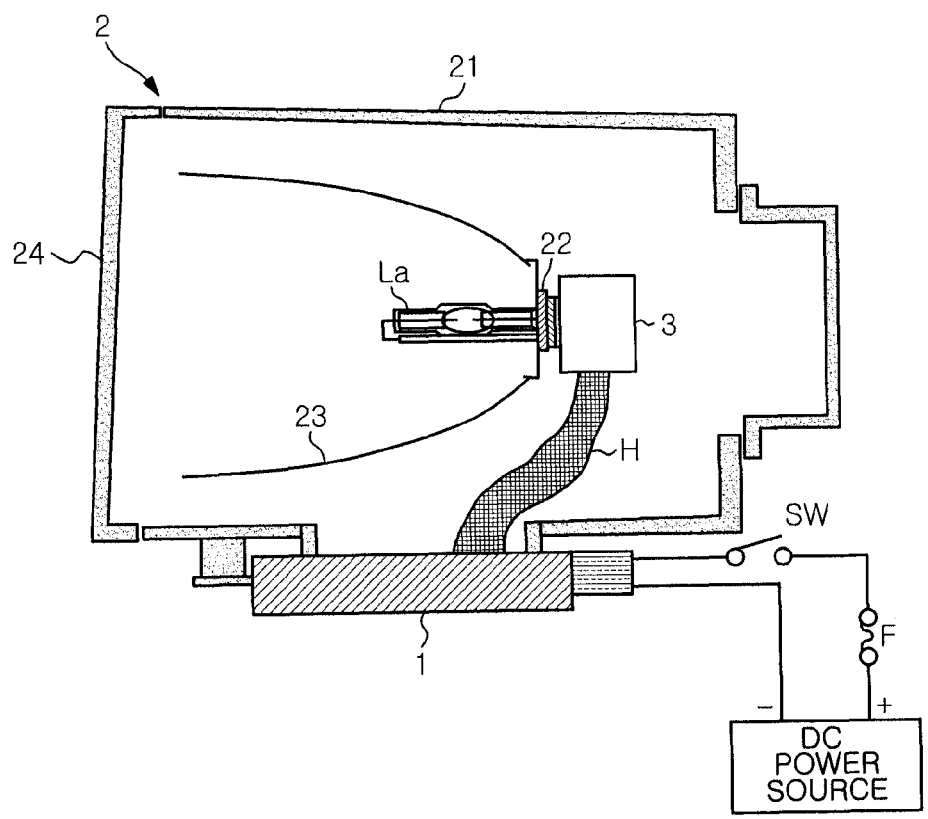
FIG. 2 is a side cross-sectional view of the illumination apparatus.

As shown in FIG. 2, the illumination apparatus 2 for a vehicle includes a housing 21 formed in a substantially box shape and having an opening on a front surface, a socket 22 for attaching the discharge lamp La to the igniter 3, a reflection plate 23 which reflects the light irradiated from the discharge lamp La in a forward direction, and a light-transmitting cover 24 attached to the opening of the housing 21. The discharge lamp lighting device 1 is disposed on the lower side of the housing 21, and an output connector of the discharge lamp lighting device 1 is coupled to the igniter 3 through a harness H.

Further, an input connector of the discharge lamp lighting device 1 is connected to the battery (DC power source) with a switch SW and a fuse F. Thus, when the switch SW is turned on, power is supplied to the discharge lamp La from the discharge lamp lighting device 1, and the discharge lamp La emits light. The light from the discharge lamp La, reflected directly or by the reflection plate 23, propagates through the light transmitting cover 24. Then, the light is emitted to the outside of the illumination apparatus 2 for a vehicle.

Figure 3:
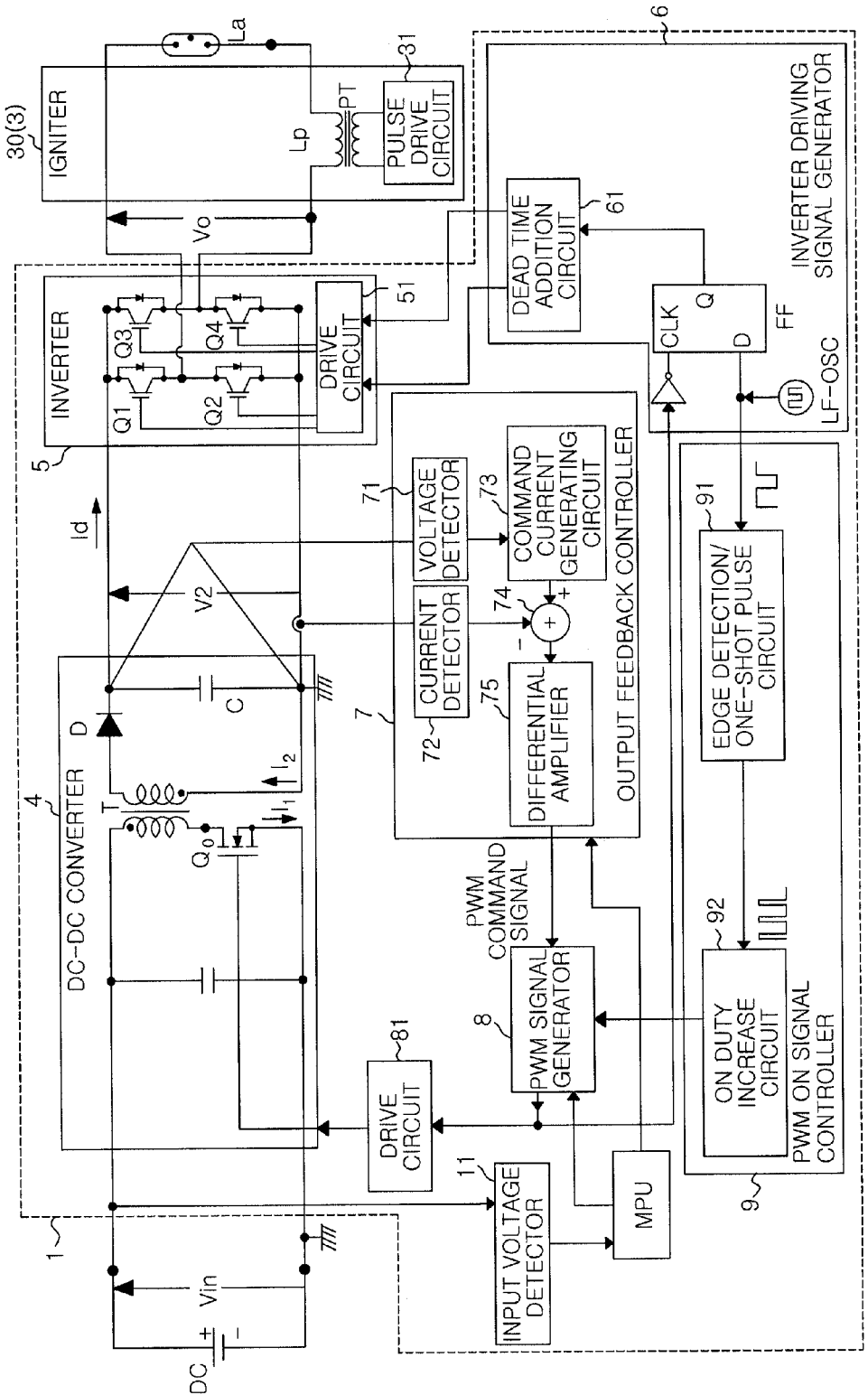
FIG. 3 is a schematic diagram of the discharge lamp lighting device.

Referring to FIG. 3, the discharge lamp lighting device 1 includes a DC-DC converter 4, an inverter 5, an inverter driving signal generator 6, an output feedback controller 7, a PWM signal generator 8, and a PWM ON signal controller 9. An output current of the discharge lamp lighting device 1 is supplied to the discharge lamp La through a starting circuit 30 serving as the igniter 3. Further, the discharge lamp lighting device 1 includes an input voltage detector 11 which detects an input voltage of the DC-DC converter 4 and a controller MPU which controls various circuits such as the output feedback controller 7, the PWM signal generator 8, and the like.

The DC-DC converter 4 is formed of a flyback converter, in which a series circuit consisting of a switching element Q0 and a primary winding of a transformer T is connected between both terminals of the DC power source. The switching element Q0 is turned on and off by a PWM signal outputted from the PWM signal generator 8. The DC-DC converter 4 rectifies and smoothes a voltage, which is induced in a secondary winding of the transformer T in accordance with the turning ON/OFF of the switching element Q0, by a diode D and a smoothing capacitor C and outputs a DC power with a desired voltage V2. Further, the DC-DC converter 4 is not limited to the above configuration, and may be configured as, e.g., a step-up chopper, a step-down chopper, or a step-up/down chopper.

The inverter 5 is formed of a full-bridge inverter including switching elements Q1 to Q4, and connection points of the switching elements Q1, Q2 and Q3, Q4 serve as output terminals to the starting circuit 30. In the inverter 5, in response to a drive signal from the inverter driving signal generator 6, a drive circuit 51 alternately turns on/off a pair of switching elements Q1 and Q4, and a pair of switching elements Q2 and Q3. Accordingly, the DC power with the voltage V2 outputted from the DC-DC converter 4 is converted into an alternating square wave power with a voltage Vo. Further, the inverter 5 is not limited to the above configuration, and may be formed of, e.g., a half-bridge, or be configured to additionally have a chopper function.

The starting circuit 30 includes a pulse transformer PT whose secondary winding is connected via the discharge lamp La between the output terminals of the inverter 5 and a pulse drive circuit 31 connected to a primary winding of the pulse transformer PT. The starting circuit 30 generates a high voltage pulse on the secondary winding by supplying a pulse current to the primary winding of the pulse transformer PT at a predetermined repetition period by the pulse drive circuit 31. Thus, the discharge lamp La is turned on by using the high voltage pulse as a kick voltage. Further, the starting circuit 30 is not limited to the above configuration, and for example, may be configured to use an LC resonance voltage.

The inverter driving signal generator 6 includes a low frequency oscillation circuit, (LF-OSC) which oscillates at a frequency (e.g., 150~500 Hz) without causing acoustic resonance, a flip-flop FF, and a dead time addition circuit 61. The inverter driving signal generator 6 outputs, to the drive circuit 51, a two-phase clock signal having a dead time during which all of the switching elements Q1 to Q4 are turned off, the dead time being added by the dead time addition circuit 61.

The output feedback controller 7 includes a voltage detector 71 for detecting the output voltage V2 of the DC-DC converter 4, a current detector 72 for detecting the output current Id of the DC-DC converter 4, a command current generating circuit 73, a subtractor 74, and a differential amplifier 75. The command current generating circuit 73 equivalently detects a voltage of the discharge lamp La from the output voltage V2 detected by the voltage detector 71, and calculates a command current value from the detected voltage of the discharge lamp La and a power value to be supplied to the discharge lamp La. Further, the current of the discharge lamp La is detected equivalently from the output current Id detected by the current detector 72. Then, the subtractor 74 calculates a difference between the command current value and the detected current of the discharge lamp La. The differential amplifier 75 generates a PWM command signal accordingly and outputs the PWM command signal to the PWM signal generator 8.

The PWM signal generator 8 receives the PWM command signal outputted from the output feedback controller 7, generates a PWM signal having a duty for adjusting the output voltage V2 of the DC-DC converter 4 to a desired value, and outputs it the switching element Q0 via a drive circuit 81.

Thus, the discharge lamp lighting device 1 performs the constant power control on lighting of the discharge lamp La.

The PWM ON signal controller 9 includes an edge detection/one-shot pulse circuit 91, and an ON duty increase circuit 92. The edge detection/one-shot pulse circuit 91 detects a rising edge and a falling edge of the signal sent from the low frequency oscillation circuit (LF-OSC) of the inverter driving signal generator 6 and generates a pulse signal with a predetermined width. The ON duty increase circuit 92 outputs a signal for increasing the ON period of the switching element Q0 to the PWM signal generator 8 during the duration of the pulse width. Accordingly, the output power of the DC-DC converter 4 increases.

The PWM ON signal controller 9 detects a rising edge and a falling edge at which the signal of the low frequency oscillation circuit (LF-OSC) is inverted, and then performs switching so as to increase the ON duty of the switching element Q0 to a predetermined value during a predetermined period. Thus, the PWM signal generator 8 performs "open loop control" without being subjected to feedback control by the output feedback controller 7, and generates a PWM signal such that the ON duty of the switching element Q0 is increased to the predetermined value.

Figure 4:
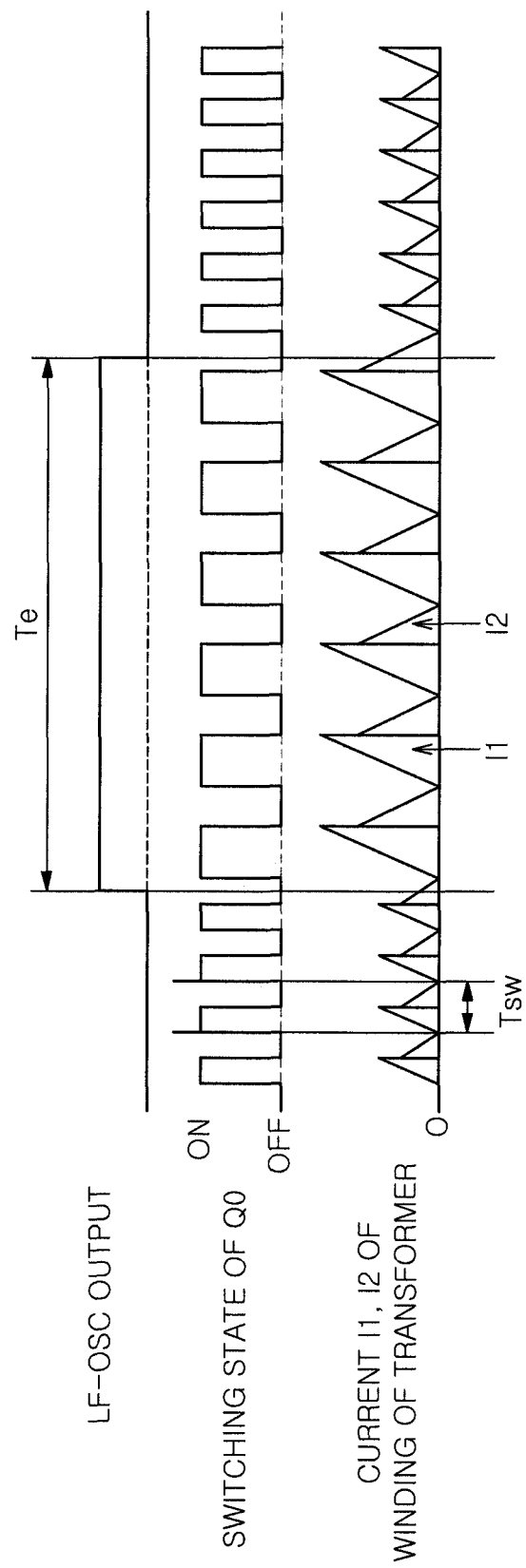
FIG. 4 is an operation waveform diagram for explaining an operation of the discharge lamp lighting device.

In the discharge lamp lighting device 1, the operation at the time of polarity inversion of the output voltage Vo of the inverter 5 will be described with reference to an operation waveform diagram shown in FIG. 4. In the discharge lamp lighting device 1 of this embodiment, the polarity inversion of the output voltage Vo is determined based on the signal of the low frequency oscillation circuit LF-OSC. The edge detection/one-shot pulse circuit 91 of the PWM ON signal controller 9 detects a rising edge and a falling edge at which the signal of the low frequency oscillation circuit LF-OSC is inverted and then generates a pulse signal having a predetermined pulse width Te. Hereinafter, the pulse width Te of the pulse signal is referred to as "output increase period Te."

The ON duty increase circuit 92 switches the PWM signal generator 8 to increase the ON duty of the switching element Q0 to a predetermined value during the output increase period Te, regardless of the PWM command signal outputted from the output feedback controller 7. Thus, the PWM signal generator 8 generates a PWM signal in which the ON duty of the switching element Q0 is increased to the predetermined value without being subjected to feedback control by the output feedback controller 7.

The DC-DC converter 4 operates in a current continuous critical mode (CCCM) in which the switching element Q0 is turned on again when the switching element Q0 is turned off and the current I2 of the secondary winding of the transformer T reaches substantially zero. Thus, a switching cycle Tsw of the switching element Q0 is larger in the output increase period Te than in the other period. Herein, the switching operation of the DC-DC converter 4 is not limited to the above-described current critical mode. For example, the switching operation may be performed in a current discontinuous mode in which the switching element Q0 is turned on again during the current I2 of the secondary winding is zero. Alternatively, the switching operation may be performed in a current continuous mode in which the switching element Q0 is turned on while the current I2 of the secondary winding is flowing. Further, the switching operation may be performed at a fixed switching frequency.

In the discharge lamp lighting device 1 of the embodiment, the PWM signal generator 8 is controlled to operate in an open loop at the time of the polarity inversion of the output voltage Vo of the inverter 5, and drives the switching element Q0 of the DC-DC converter 4 by a PWM signal in which the ON duty has been increased. Further, the polarity of the output voltage Vo of the inverter 5 is inverted in synchronization with the falling edge of the first PWM signal, and energy is regenerated from the inductance component Lp of the starting circuit 30, thereby increasing an output power of the DC-DC converter 4. Accordingly, the output voltage Vo of the inverter 5 is increased to ensure the required re-ignition voltage, thereby stably turning on the discharge lamp La.

Further, the polarity of the alternating square wave power with the voltage Vo is inverted in synchronization with the switching of the switching element Q0 immediately after the ON duty is extended by the PWM ON signal controller 9. Thus, it is possible to increase the output voltage of the DC-DC converter 4 and ensure the required re-ignition voltage even in the dead time period during which all of the switching elements Q1 to Q4 of the inverter 5 are turned off, e.g., immediately before the polarity of the alternating power is inverted.

Generally, even discharge lamps of the same type may have different lamp voltages according to each manufacturer, production date, and the like. Further, the lamp voltage is typically low in the initial stage of use and tends to increase as the lighting time becomes longer. Therefore, regardless of the lamp voltage of the discharge lamp as described above, when the output voltage of DC-DC converter is increased by a certain amount, the stress applied to the discharge lamp increases. This may cause the switching noise or the shortening in the lifespan of the discharge lamp.

In the discharge lamp lighting device 1 of this embodiment, when at least one of the voltage detector 71 and the current detector 72 detects a predetermined detection value, the controller MPU changes the increase amount of the DC output power by the PWM ON signal controller 9 in accordance with the detection value. Specifically, the controller MPU determines the increase amount in the DC output power required in the polarity inversion of the output voltage Vo of the inverter 5 based on at least one of the output voltage V2 and the output current Id of the DC-DC converter 4, during the output increase period Te. Then, the controller MPU changes a switching frequency of the DC-DC converter 4, i.e., the ON duty or the cycle of the PWM signal generated by the PWM signal generator 8 in accordance with the determined increase amount.

Figure 5:
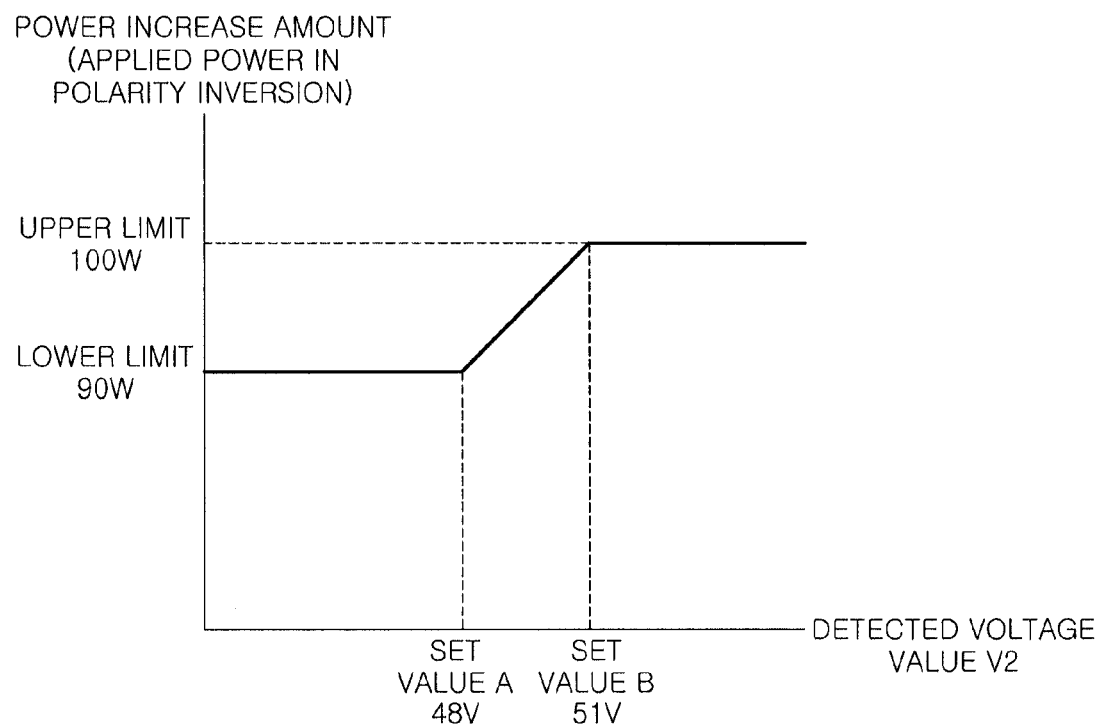
FIG. 5 is a graph showing the amount of increase in DC power for the detected voltage value in the discharge lamp lighting device.

Hereinafter, the description will be made on the basis of a control example of changing the increase amount in the DC power outputted from the DC-DC converter 4 in accordance with the detected voltage value of the voltage detector 71. As shown in FIG. 5, in the case of the lamp in the initial state of use, a detected voltage value of the voltage detector is set to a set value A, e.g., 48 V. When the voltage detector detects the set value (e.g., set value A: 48V), the increase amount in the output power is set to 90 W which is a lower limit, and more power than necessary is not applied to the discharge lamp La.

This lower limit is set to a maximum value within a range that does not apply stress on various circuit components including the discharge lamp La. Further, even when the detected voltage value is equal to or less than 48V, the increase amount of the output power remains the lower limit, and in this example it is set to 90 W. In this way, by limiting the increase amount of the DC power, it is possible to ensure a required re-ignition voltage without applying excessive stress on various circuits as well as the discharge lamp La while suppressing the flickering or the turn-off of the discharge lamp La.

The detected voltage value usually increases to 48~51V with an increase in lighting time of the discharge lamp La. In this case, the controller MPU changes the increase amount in the output power or the output current of the DC-DC converter 4 in accordance with the detected voltage value from the voltage detector 71. By this configuration, it is possible to ensure a proper re-ignition voltage according to the use state of the discharge lamp La such as the initial state or the end-of-life state.

When the detected voltage value is equal to or more than a set value B, e.g., 51 V, the increase amount in the output power is set to an upper limit, e.g., 100 W, and only the power that is necessary is applied to the discharge lamp La. By this configuration, since the amount of the DC power supplied to the discharge lamp La is limited, it is possible to suppress excessive stress from being applied to the discharge lamp La or various circuits while ensuring a sufficient re-ignition voltage. Further, the above set values A and B are merely exemplary and not necessarily limited to the above values.

The upper and lower limits in the increase amount of the output power as shown in FIG. 5 are stored in a form of a table in a ROM (not shown) disposed in the controller MPU. The controller MPU changes a signal, in which the ON duty has been increased, inputted to the PWM signal generator 8 from the ON duty increase circuit 92 depending on the detected voltage value of the voltage detector 71 and the table stored in the ROM. Thus, it is possible to vary the increase amount in the DC power outputted from the DC-DC converter 4 in accordance with the detected voltage value of the voltage detector 71 and ensure a proper re-ignition voltage according to the use state of the discharge lamp La.

In the present embodiment, although the control example using the detected voltage value is described, a control example using the detected current value of the current detector 72 can be configured in the same manner as the above-described control example corresponding to the detected voltage value of the voltage detector 71. Further, the table which shows a relationship between the increase amount of the output power and the detected voltage value is not limited to the illustrated graph shown in FIG. 5, and a table shown in another linear graph may be employed as long as the same operation is achieved.

Figure 6:
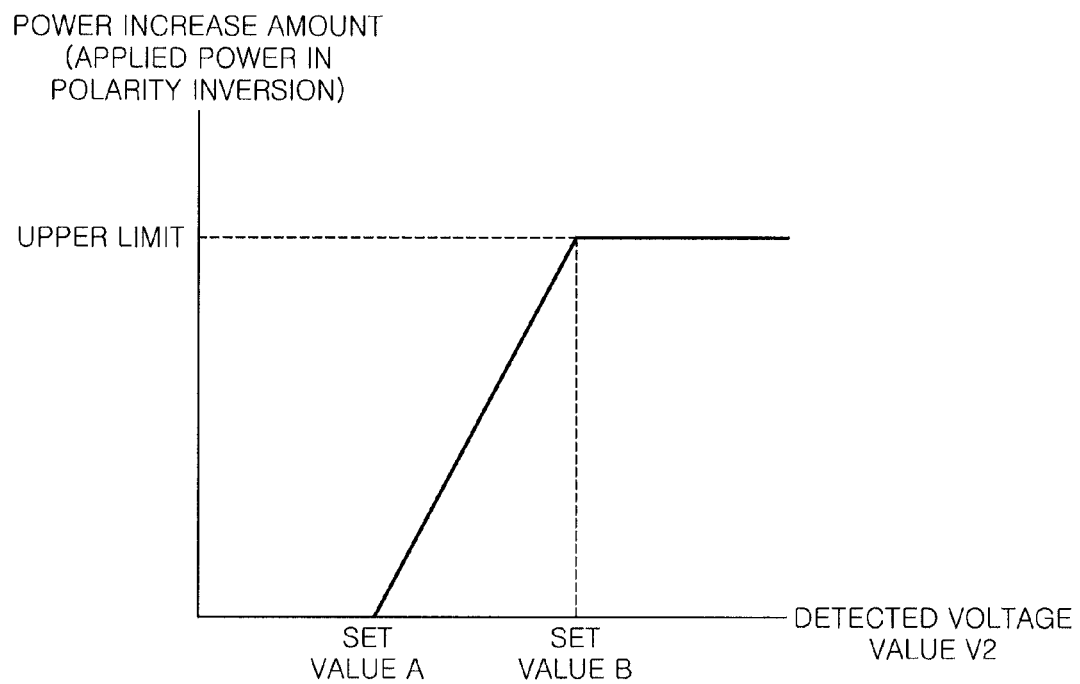
FIG. 6 is a graph showing the amount of increase in DC power for the detected voltage value in a discharge lamp lighting device according to a modification.

Next, the discharge lamp lighting device according to modifications of the above embodiment will be described with reference to the table shown by the graphs in FIGS. 6 and 7. The circuit configuration of the discharge lamp lighting device in these modifications is the same as the above-described embodiment.

Typically, the lamp voltage is low in the initial use state of the discharge lamp La, and the lamp current hardly becomes zero in the polarity inversion of the alternating power. Thus, a need for ensuring a high re-ignition voltage is relatively low. In this case, as shown in FIG. 6, an increase amount of the output power corresponding to a predetermined voltage value (e.g., set value B) is defined as the upper limit. Accordingly, if the detected voltage value is equal to or more than the set value, the increase amount of the output power is set to the upper limit. Further, if the detected voltage value is equal to or less than a predetermined voltage value (e.g., set value A), the amount increase of the DC output power is set to zero.

Figure 7:
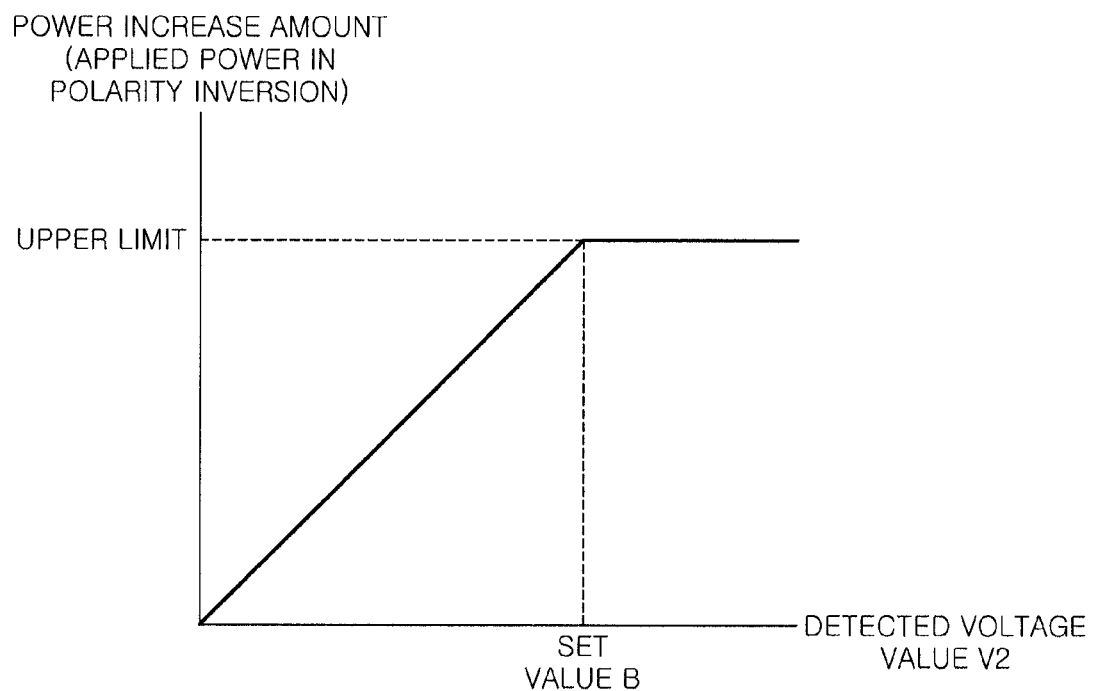
FIG. 7 is a graph showing the amount of increase in DC power for the detected voltage value in a discharge lamp lighting device according to another modification.

Alternatively, as shown in FIG. 7, only the upper limit may be defined as an increase amount of the output power corresponding to a predetermined voltage value (e.g., set value B). Accordingly, the increase amount of the output power may be changed at a constant slope according to the detected voltage value ranging from zero to the set value B.

With these modifications, since the lamp voltage is low in the initial use state of the discharge lamp and the detected voltage value also is low, it is possible to suppress the switching noise of the DC-DC converter 4 by not unnecessarily increasing the DC output power.

Next, the discharge lamp lighting device according to another modification of the above embodiment will be described with reference to FIG. 8. The discharge lamp lighting device 1 according to this modification utilizes a timer function of the controller MPU and counts the lighting time of the discharge lamp La. Accordingly, the controller MPU increases the DC power as the lighting time becomes longer. The circuit configuration of the discharge lamp lighting device 1 in this modification is the same as that of the above embodiment.

In the above embodiment, the discharge lamp lighting device 1 performs the constant power control of the discharge lamp La. As mentioned above, the lamp voltage of the discharge lamp La increases as the lighting time becomes longer, and, under the constant power control, an output current I1$a$ (lamp current) of the inverter 5 declines gradually with an increase in the lamp voltage as shown in FIG. 8A. For example, under the low-power control of 35 W, the output current I1$a$ is 0.8 A in the initial use state of the lamp, 0.7 A in the lighting time of 2000 hours, and 0.39 A in the lighting time of 4000 hours.

In this modification, as shown in FIG. 8B, the decrease of the output current I1$a$ of the inverter 5 is suppressed by increasing the DC power as the lighting time becomes longer. For example, under the low-power control of 35 W, when the output power is increased to 36 W in the lighting time of 2000 hours, the output current I1$a$ is 0.7 A. Further, when the output power is increased to 37 W in the lighting time of 4000 hours, the output current I1$a$ becomes 0.4 A. Similarly, the output power values for the lighting times of the lamp as shown in FIG. 8B is stored as a table in the ROM of the controller MPU.

With this modification, it is possible to supply power more stably according to the lighting time of the discharge lamp La, thereby suppressing the flickering and the turn-off during its lifetime. In addition, the output power value for the lighting time of the lamp is not limited to the table as shown by the graph in FIG. 8B, and another table may be employed as long as the same operation is performed.

Figure 9:
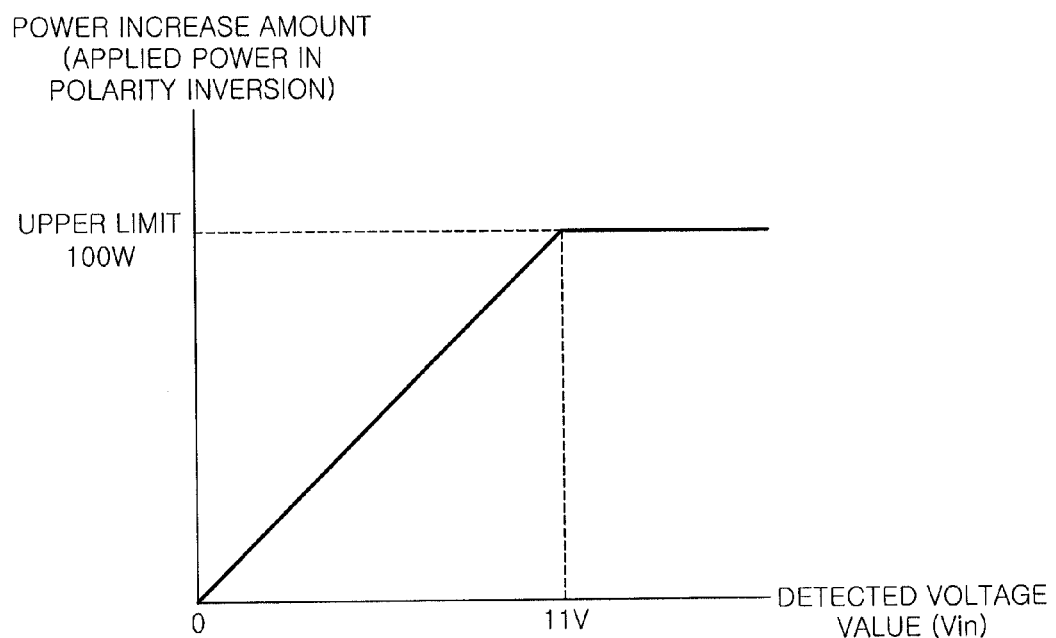
FIG. 9 shows the amount of increase in the DC power for the detected voltage value in a discharge lamp lighting device according to still another modification.
Figure 10:
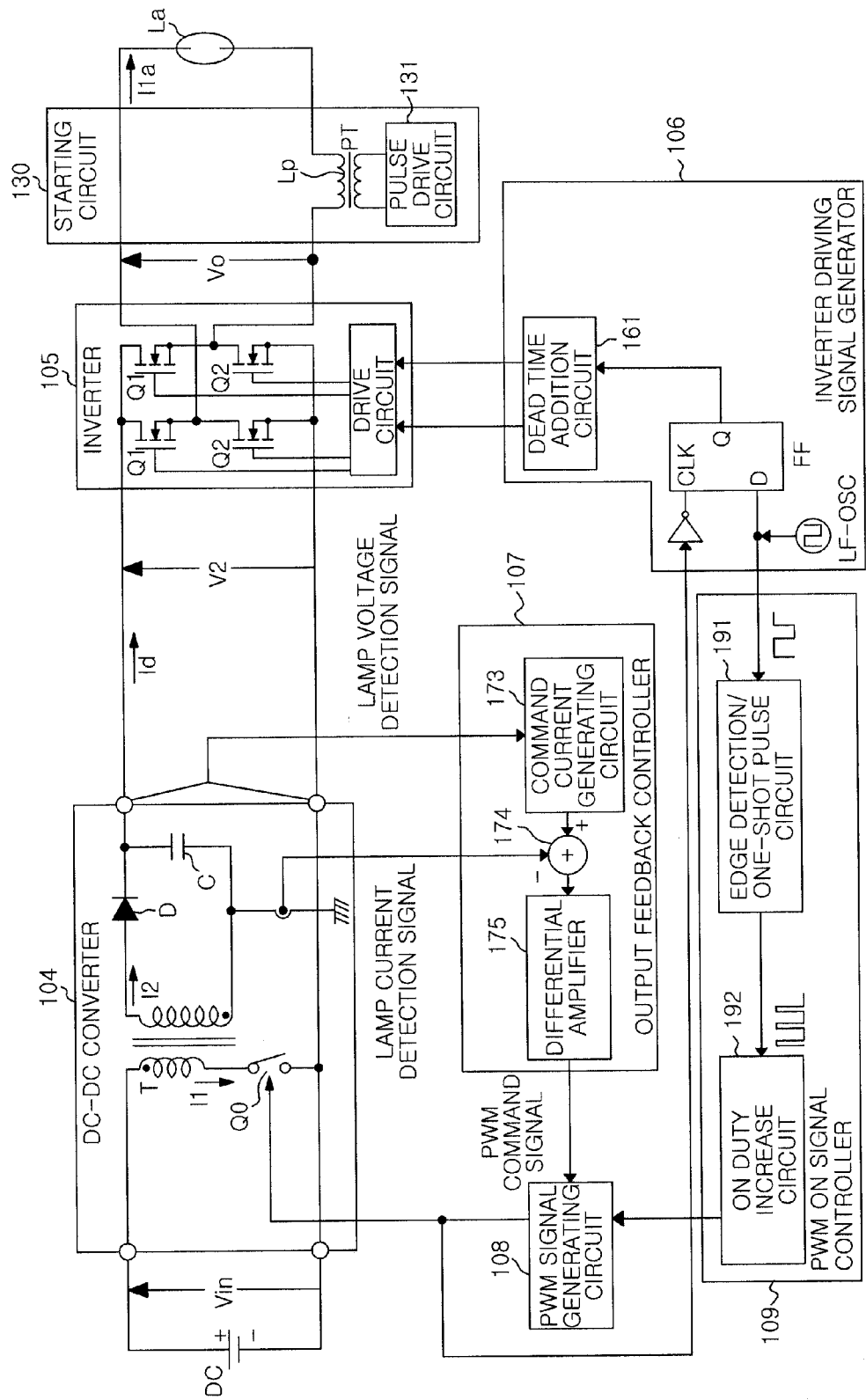
FIG. 10 is a schematic diagram of a conventional discharge lamp lighting device.
Figure 11:
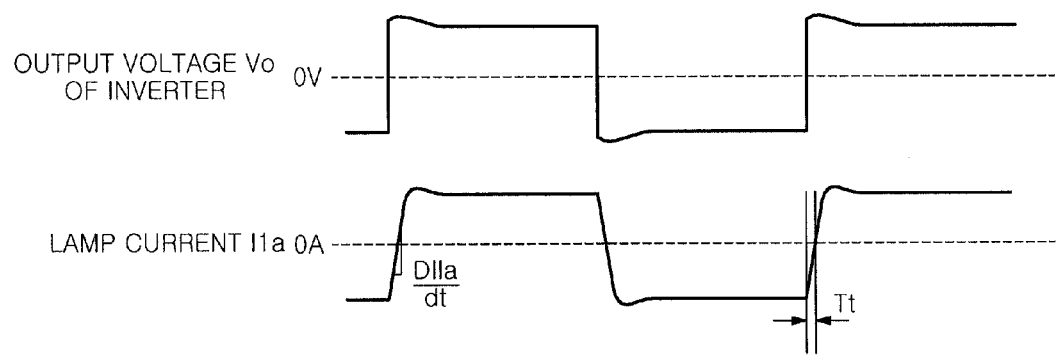
FIG. 11 is an operation waveform diagram for explaining an operation of the conventional discharge lamp lighting device.
Figure 12:
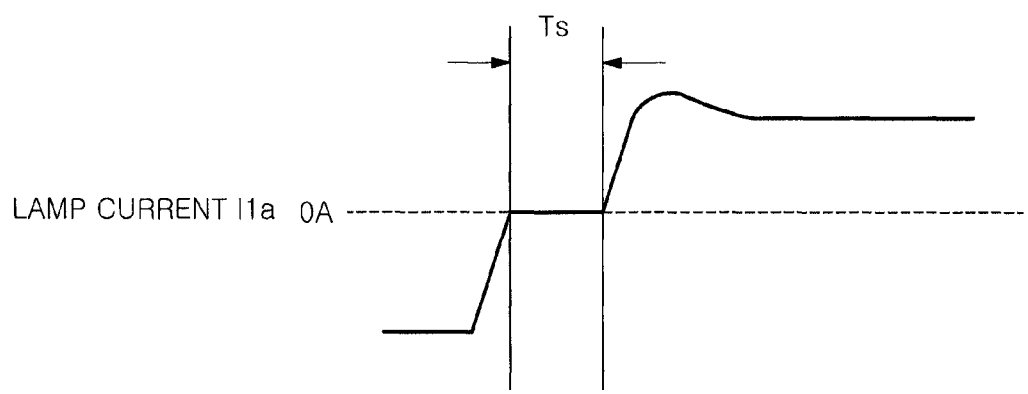
FIG. 12 is a partially enlarged view of the operation waveform diagram.

Next, the discharge lamp lighting device according to still another modification of the above embodiment will be described with reference to the constant table shown in FIG. 9. In the discharge lamp lighting device 1 according to this modification, when the input voltage detector 11 detects a predetermined voltage value, the controller MPU changes the increase amount of the DC output power based on the detected value. The circuit configuration of the discharge lamp lighting device 1 in this modification is the same as the above-described embodiment.

Specifically, when the input voltage detector 11 detects a voltage value less than a predetermined voltage value (11 V in the illustrated example), the increase amount in the DC output power is reduced according to the detected voltage value. Further, when the input voltage detector 11 detects a voltage value equal to or greater than the predetermined voltage value, the increase amount of the DC output power is maintained at a fixed upper limit (100 V in the illustrated example). The graph as shown in FIG. 9 is also stored as a table in the ROM of the controller MPU.

With this modification, since the increase amount of the DC output power is reduced at a low input voltage at which an influence of the load stress is large, it is possible to prevent excessive stress from being applied to the discharge lamp La and various circuits. Further, the output power value for the input voltage value is not limited to the table as shown by the graph in FIG. 9, and another table may be employed as long as the same control is performed.

As described above, the discharge lamp lighting device 1 according to the present invention drives the switching element Q0 of the DC-DC converter 4 by a PWM signal in which the ON duty has been increased according to at least one of the detected voltage value V2 of the voltage detector 71 and the detected current value I2 of the current detector 72 in the polarity inversion of the inverter 5 and increases the output power of the DC-DC converter 4. Specifically, the PWM ON signal controller 9 performs switching for the PWM signal generator 8 so as to increase the turning-on duration of the switching element Q0 to a predetermined value. The controller MPU controls the PWM signal generator 8 to change the increase amount of the output power according to at least one of the detected voltage value V2 of the voltage detector 71 and the detected current value I2 of the current detector 72.

However, the present invention is not limited thereto, and, for example, by changing the level of the PWM command signal outputted from the output feedback controller 7, the turning-on duration of the switching element Q0 may be increased to a predetermined value. Alternatively, by changing a command current generated from the command current generating circuit 73 of the output feedback controller 7, the switching conditions such as a switching frequency or ON duty of the DC-DC converter 4 may be instantly employed.

Although the circuit configuration of the discharge lamp lighting device 1 is not limited to the configuration described above, another circuit configuration may be used as long as the same operation is performed. Further, the same operation may be achieved in software by using the controller MPU. For example, the polarity inversion of the output voltage in the inverter 5 may be started in synchronization with an interrupt using the PWM signal.

While the invention has been shown and described with respect to the embodiments, it will be understood by those skilled in the art that various changes and modifications may be made without departing from the scope of the invention as defined in the following claims.

What is claimed is:

1. A discharge lamp lighting device light which drives a discharge lamp with an alternating power, comprising:
   a DC-DC converter configured to convert a voltage of a DC power source into a DC power and output the DC power, by changing a PWM signal inputted to a switching element;
   an inverter configured to convert the DC power into the alternating power having a frequency low than a switching frequency of the DC-DC converter;
   a voltage detector which detects an output voltage of the DC-DC converter;
   a current detector which detects an output current of the DC-DC converter;
   a controller configured to control the switching frequency of the DC-DC converter according to a detection value of at least one of the voltage detector and the current detector; and
   a PWM ON signal controller which increases the DC power by lengthening an ON duty of the PWM signal during a predetermined period after a start of polarity inversion of the alternating power,
   wherein when at least one of the voltage detector and the current detector detects a predetermined detection value, the controller changes an increase amount of the DC power increased by the PWM ON signal controller according to the detection value.

2. The discharge lamp lighting device of claim 1, wherein a polarity of the alternating power is inverted in synchronization with a switching of the switching element immediately after the ON duty is increased by the PWM ON signal controller.

3. The discharge lamp lighting device of claim 1, wherein the controller changes the DC power according to the detection value of the voltage detector, from immediately before a polarity of the alternating power is inverted.

4. The discharge lamp lighting device of claim 2, wherein the controller changes the DC power according to the detection value of the voltage detector, from immediately before a polarity of the alternating power is inverted.

5. The discharge lamp lighting device of claim 1, wherein the controller sets an upper limit in the increase amount of the DC power, and maintains the increase amount at the upper limit when a voltage value detected by the voltage detector is equal to or greater than a voltage value corresponding to the upper limit.

6. The discharge lamp lighting device of claim 1, wherein the controller sets a lower limit in the increase amount of the DC power, and maintains the increase amount at the lower limit when a voltage value detected by the voltage detector is equal to or less than a voltage value corresponding to the lower limit.

7. The discharge lamp lighting device of claim 1, wherein the controller counts a lighting time of the discharge lamp, and changes the DC power according to the lighting time.

8. The discharge lamp lighting device of claim 1, further comprising an input voltage detector which detects an input voltage value of the DC-DC converter, wherein when the input voltage detector detects a predetermined voltage value, the controller changes an increase amount of the DC power according to the detected voltage value.

9. An illumination apparatus comprising the discharge lamp lighting device described in claim 1.

10. A vehicle comprising the illumination apparatus described in claim 9.

* * * * *